United States Patent [19]

Inoue et al.

[11] Patent Number: 4,721,765

[45] Date of Patent: Jan. 26, 1988

[54] ROOM TEMPERATURE-CURABLE ORGANOPOLYSILOXANE COMPOSITION

[75] Inventors: Yoshio Inoue; Masatoshi Arai, both of Annaka; Koji Yokoo, Tomioka, all of Japan

[73] Assignee: Shin Etsu Chemical Co., Ltd., Tokyo, Japan

[21] Appl. No.: 30,693

[22] Filed: Mar. 25, 1987

[30] Foreign Application Priority Data

Apr. 2, 1986 [JP] Japan ................................. 61-76396

[51] Int. Cl.$^4$ ............................................. C08G 77/06
[52] U.S. Cl. ...................................... 528/18; 528/33; 528/34
[58] Field of Search ............................. 528/18, 33, 34

[56] References Cited

U.S. PATENT DOCUMENTS 4,483,973  11/1984  Lucas et al. ........................... 528/34
4,515,932  5/1985  Chung ................................... 528/34

Primary Examiner—Melvyn I. Marquis
Attorney, Agent, or Firm—Hopgood, Calimafde, Kalil, Blaustein & Judlowe

[57] ABSTRACT

The invention provides a room temperature-curable organopolysiloxane composition curable into a rubbery elastomer, which has excellent storage stability under a moisture-free condition without losing high curability. The composition comprises, in addition to the conventional essential ingredients of a hydroxy- or alkoxy-terminated diorganopolysiloxane, filler, triisopropenyloxy silane compound as a crosslinking agent and a guanidino-containing organosilicon compound as a curing aid, an amino-containing silane compound such as MeSi[NH—C$_3$H$_6$—Si(OEt)$_3$]$_3$ and MeSi[NH—C$_2$H$_4$NHC$_3$H$_6$—Si(OMe)$_3$]$_3$.

8 Claims, No Drawings

ROOM TEMPERATURE-CURABLE ORGANOPOLYSILOXANE COMPOSITION

BACKGROUND OF THE INVENTION

The present invention relates to a room temperature-curable organopolysiloxane composition or, more particularly, to an organopolysiloxane composition excellently stable in storage but curable at room temperature by the mechanism of dealcoholation condensation in the presence of the atmospheric moisture and capable of exhibiting strong adhesion to the substrate surface on which it has been cured.

Several classes of room temperature-curable organopolysiloxane compositions, referred to as the RTV compositions hereinbelow, are known in the prior art as classified according to the mechanism of the reaction for the crosslink formation. In particular, one of the most important classes include the so-called dealcoholation type RTV compositions comprising a diorganopolysiloxane, of which each of the silicon atoms at the molecular chain terminals has a hydroxy group directly bonded thereto, as the base ingredient, a trialkoxysilane compound such as methyl trimethoxy silane as a crosslinking agent, and a catalytically active compound which may be an organic titanium compound or an organic chelate compound of titanium. The crosslinking reaction in the RTV composition of this type proceeds by the dealcoholation condensation in the presence of atmospheric moisture between the silanolic hydroxy groups in the diorganopolysiloxane and the alkoxy groups in the crosslinking agent producing an alcohol as the condensation by-product to give a cured composition having rubbery elasticity. By virtue of the absence of corrosiveness and offensive odor as the nature of the alcohol as the condensation by-product, the RTV compositions of this type are widely used as an adhesive or other materials in the electric and electronic industries.

The RTV compositions of the dealcoholation type, of course, are not free from several disadvantages and problems. For example, the curing velocity thereof is usually not high enough and, in particular, complete curing of the composition can hardly be obtained in the core portion of a thick body. Moreover, the storage stability of the composition is relatively low so that the composition gradually loses curability after a long period of storage even under an anhydrous condition.

Various attempts and proposals have been made hitherto to improve the dealcoholation type RTV compositions in the above mentioned regards. For example, admixture of a special dialkoxy silane compound is proposed to work as a so-called silane scavenger in the dealcoholation type RTV composition improving the curability and storage stability of the composition. If not to mention the expensiveness of such a special silane compound, no sufficient improvement of the storage stability can be obtained by the addition thereof unless the silane compound has one or more of hydrolyzable groups having higher reactivity than the alkoxy groups, such as amido and amino groups. Introduction of such groups to the silane compound is of course detrimental in respect of the corrosiveness and offensive odor of the composition so that the usefulness of the composition may be greatly decreased as a material used in the electric and electronic industries.

SUMMARY OF THE INVENTION

The present invention accordingly has an object to provide a RTV composition of the dealcoholation type freed from the above described problems and disadvantages in the conventional RTV compositions of the same type. Thus, the RTV composition of the present invention comprises:

(A) a combination composed of (A-1) 100 parts by weight of a diorganopolysiloxane having a substantially linear molecular structure, of which each of the silicon atoms at the molecular chain ends has a hydroxy group or two alkoxy groups directly bonded thereto, (A-2) from 1 to 400 parts by weight of a filler, (A-3) an alkenyloxy silane compound represented by the general formula $$R^1{}_n SiX_{4-n}, \qquad (I)$$

in which $R^1$ is a substituted or unsubstituted monovalent hydrocarbon group selected from the class consisting of methyl, ethyl, propyl, vinyl, phenyl and 3,3,3-trifluoropropyl groups, X is an alkenyloxy group represented by the general formula $$-O-C(CH_2R^3)=CHR^2, \qquad (II)$$

$R^2$ and $R^3$ each being a hydrogen atom or an alkyl group selected from the class consisting of methyl, ethyl and propyl groups, and n is zero or 1, or a partial hydrolyzate thereof, in an amount at least equimolar to the hydroxy groups and water contained in the components (A-1) and (A-2) or, in particular, in the range from 0.1 to 5 parts by weight, and (A-4) from 0.01 to 10 parts by weight of an organosilane or organopolysiloxane compound having, in a molecule, at least one substituted or unsubstituted guanidino group represented by the general formula $$-N=C(NR^4{}_2)_2, \qquad (III)$$

in which $R^4$ is a hydrogen atom or a monovalent hydrocarbon group;

(B) an organosilane compound represented by the general formula $$R^1Si[NR^2-(C_2H_4-NH)_xR^5-Si(OR^4)_3]_3, \qquad (IV)$$

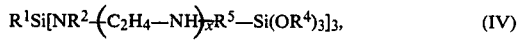

in which $R^1$, $R^2$ and $R^4$ each have the same meaning as defined above, $R^5$ is a divalent hydrocarbon group having 1 to 9 carbon atoms and x is zero, 1 or 2, in an amount in the range from 0.1 to 5.0% by weight based on the component (A); and (C) an organic tin compound in an amount in the range from 0.01 to 10% by weight based on the component (A).

It is optional that the above described inventive RTV composition may be admixed with, in addition to the above defined essential components (A), (B) and (C):

(D) an alcoholic compound represented by the general formula $$R^6OH, \qquad (V)$$

in which $R^6$ is a monovalent hydrocarbon group, in an amount up to 10% by weight based on the component (A) but at least equimolar to the groups denoted by X in the component (A); and/or (E) an alkoxy silane compound represented by the general formula $$R^7{}_m Si(OR^8)_{4-m},\qquad (VI)$$

in which $R^7$ is a monovalent hydrocarbon group, $R^8$ is an alkyl group or an alkoxy-substituted alkyl group and m is zero or 1, or a partial hydrolyzate thereof, in an amount up to 50% by weight based on the component (A).

DETAILED DESCRIPTION OF THE PREFERRED EMBODIMENTS

As is understood from the above given summary of the invention, the essential ingredients in the inventive RTV composition are the components (A-1) to (A-4), (B) and (C). This unique formulation of the composition has been established as a result of the extensive investigations undertaken on the base of the discovery that the problems in the conventional dealcoholation type RTV composition relative to the curability and storage stability are ascribable mainly to the relatively low reactivity of the alkoxy groups in the conventional trialkoxy silane compound as the crosslinking agent with the silanolic terminal groups in the diorganopolysiloxane as the base ingredient to leave a considerable amount of the silanolic hydroxy groups uncrosslinked.

Namely, the inventive RTV composition comprises the specific alkenyloxy silane compound as the component (A-3) in place of the conventional alkoxy silane compound as combined with a guanidino-containing organosilicon compound as the component (A-4) which serves as a curing aid. The improvements obtained by the components (A-3) and (A-4) can be further enhanced and more concrete when the composition is additionally admixed with the specific organosilane compound as the component (B).

The base component, i.e. component (A-1), in the combination for the component (A) of the inventive RTV composition is a diorganopolysiloxane which is represented by the average unit formula $$R_a SiO_{(4-a)/2},\qquad (VIII)$$

in which R is a substituted or unsubstituted monovalent hydrocarbon group selected from the class consisting of alkyl groups, e.g. methyl, ethyl, propyl, butyl, 2-ethylbutyl and octyl groups, cycloalkyl groups, e.g. cyclohexyl and cyclopentyl groups, alkenyl groups, e.g. vinyl, allyl and hexenyl groups, aryl groups, e.g. phenyl, tolyl, xylyl, naphthyl and diphenyl groups and aralkyl groups, e.g. benzyl and 2-phenylethyl groups, as well as those substituted groups obtained by the replacement of a part or all of the hydrogen atoms in the above named hydrocarbon groups with substituent atoms and/or groups such as halogen atoms, cyano groups and the like, e.g. chloromethyl, 3,3,3-trifluoropropyl, 2-cyanoethyl and 3-cyanopropyl groups, and the subscript a is a positive number in the range from 1.90 to 2.05. This limitation in the value of the subscript a means that the diorganopolysiloxane should have a substantially linear molecular structure. The groups denoted by R in a molecule of the diorganopolysiloxane may all be the same ones or may be a combination of two kinds or more of the above named groups. It is essential that each of the silicon atoms at the molecular chain ends of the diorganopolysiloxane should have a hydroxy group or two alkoxy groups directly bonded thereto. It is further preferable that the diorganopolysiloxane should have a viscosity of at least 25 centistokes at 2° C. in order that the RTV composition formulated therewith may give a cured product having good rubbery elasticity and exhibiting excellent mechanical properties.

Although the base ingredient in the inventive RTV composition should be the above defined specific diorganopolysiloxane as the component (A-1), it is optional that the base ingredient of the RTV composition may be a combination of the component (A-1) and another diorganopolysiloxane of which each of the silicon atoms at the molecular chain ends does not have a silanolic hydroxy group or two alkoxy groups directly bonded thereto but the end-blocking unit is a non-functional group such as a trimethylsilyl group. The amount of such a diorganoipolysiloxane having no terminal functionality, when used, should be equal to the amount of the component (A-1) or smaller.

The component (A-2) in the inventive RTV composition is a filler including inorganic and organic ones exemplified by siliceous fillers, e.g. finely pulverized quartz, powder of fused quartz glass, silica aerogel, precipitated silica and diatomaceous earth, metal oxides, e.g. iron oxide, zinc oxide and titanium dioxide, metal carbonates, e.g. calcium carbonate, magnesium carbonate and zinc carbonate, asbestos, glass fibers, carbon black, powders of synthetic resins such as polystyrene, polyvinyl chloride and polypropylene, and so on. These fillers may be surface-treated beforehand with, for example, an organochlorosilane compound to be imparted with hydrophobicity, if desired. The amount of the filler as the component (A-2) in the inventive RTV composition should be in the range from 1 to 400 parts by weight or, preferably, from 5 to 200 parts by weight per 100 parts by weight of the diorganopolysiloxane as the component (A-1). When the amount of the filler is too small, the resultant RTV composition would not give a cured product having sufficiently high mechanical strengths. When the amount of the filler is too large, on the other hand, the composition may have an unduly increased consistency so that a great difficulty is encountered in the compounding work of the components into a fully uniform composition and, even if a uniform composition could be obtained anyhow, the RTV composition would give a cured product having poor rubbery elasticity and greatly decreased mechanical strengths.

The component (A-3) is a specific alkenyloxy-containing organosilane compound represented by the general formula (I) given above. This silane compound serves as a crosslinking agent and also is a powerful silylating agent for the silanolic hydroxy groups and the water content in the composition to increase the storage stability of the composition without affecting the curability thereof. In the general formula (I), the group denoted by $R^1$ is a substituted or unsubstituted monovalent hydrocarbon group selected from the class consisting of methyl, ethyl, propyl, phenyl and 3,3,3-trifluoropropyl groups. The symbol X denotes an alkenyloxy group represented by the general formula (II) given above, in which $R^2$ and $R^3$ are each a hydrogen atom or an alkyl group selected from the class consisting of methyl, ethyl and propyl groups. The subscript n is zero or 1 or, preferably, 1 so that the silane compound has three or four alkenyloxy groups denoted by X in a molecule. A partial hydrolysis product of such an alkenyloxy silane compound may be used instead.

Particular examples of the alkenyloxy silane compounds of the general formula (I) suitable as the component (A-3) include: methyl trivinyloxy silane; methyl tri(isopropenyloxy) silane; vinyl tri(isopropenyloxy) silane; phenyl tri(isopropenyloxy) silane; propyl tri(isopropenyloxy) silane; methyl tri(1-phenylethenyloxy) silane; methyl tri(isobuten-1-yloxy) silane; methyl tri(1-methylpropen-1-yloxy) silane; methyl tri(1,4-dimethylpentadien-1,3-yloxy) silane; and the like.

The amount of the alkenyloxy silane compound as the component (A-3) in the inventive RTV composition should be at least equimolar to or, preferably, in the range from equimolar to twice of equimolar to the water contained in the above described components (A-1) and (A-2) plus, if any, the silanolic hydroxy groups in the component (A-1). The amount should usually be in the range from 0.1 to 5 parts by weight per 100 parts by weight of the component (A-1). When the amount thereof is too small, the composition under the compounding work may be subject to undue increase of the consistency while an excessively large amount thereof is undesirable for the economical reason.

The component (A-4) in the inventive RTV composition is a guanidino-containing organosilicon compound having, in a molecule, at least one substituted or unsubstituted guanidino group represented by the general formula (III) given above, which serves as a curing aid. The symbol $R^4$ in the general formula (III) denotes a hydrogen atom or a monovalent hydrocarbon group. The guanidino group of the general formula (III) may be bonded to the silicon atom of the organosilicon compound through a divalent group which is preferably an alkylene group, e.g. $+CH_2\!\!+_3$ and $+CH_2\!\!+_4$, or an oxyalkylene group, e.g. $+CH_2\!\!+_2O+CH_2\!\!+_3$, though not particularly limitative thereto.

Particular examples of the guanidino-containing organosilicon compound suitable as the component (A-4) include: 3-(1,1,3,3-tetramethylguanidino)propyl trimethoxy silane; 3-(1,1,3,3-tetramethylguanidino)propyl methyl dimethoxy silane; 3-(1,1,3,3-tetramethylguanidino)propyl dimethyl methoxy silane; 1-[2-(1,1,3,3-tetramethylguanidino)ethyl]-1,1-diethoxy-3,3,3-trimethyl disiloxane; 4-(1,3-diethyl-1-methyl-3-propylguanidino)butyl tri(isopropenyloxy) silane; a silane of the formula $GuSiMe(O-N=CMeEt)_2$; a silane of the formula $(PhMeN)_2C=N-CH_2CH_2-O-CH_2CH_2C-H_2-Si(NMe_2)_3$; and an organopolysiloxane of the formula $MeO+SiMe_2-O+_{50}(SiMeGu-O+_{50}Me$, in which the symbols Me, Et, Pr, Ph and Gu denote methyl, ethyl, propyl, phenyl and 3-(1,1,3,3-tetramethylguanidino)propyl groups, respectively. A particularly preferable guanidino-containing organosilicon compound among them is 3-(1,1,3,3-tetramethylguanidino)propyl trimethoxy silane in respect of the easiness in the synthetic preparation.

The amount of the component (A-4) in the inventive RTV composition should be in the range from 0.01 to 10 parts by weight or, preferably, from 0.1 to 5 parts by weight per 100 parts by weight of the component (A-1). When the amount of the component (A-4) is too small, the RTV composition would have no sufficiently high curability and storage stability so that the curing reaction of the composition may take an unduly long time as a result of insufficient promotion of the crosslinking reaction between the components (A-1) and (A-3) and the composition after prolonged storage may lose curability. When the amount of the component (A-4) is too large, on the other hand, the RTV composition after curing may be colored in yellow if not to mention the economical disadvantage due to the expensiveness of the compound although the composition may have no problems in the curability and storage stability.

The component (B), which is a specific amino-containing organosilane compound of the general formula (IV), serves to further increase the storage stability of the composition and, simultaneously, to increase the adhesive bonding strength of the cured composition to the substrate surface on which the composition has been cured. In the general formula (IV), the symbols $R^1$, $R^2$ and $R^4$ each have the same meaning as defined above, $R^5$ is a divalent hydrocarbon group having 1 to 9 carbon atoms, such as alkylene groups, arylene groups and aralkylene groups, and the subscript x is zero, 1 or 2. Particular examples of the amino-containing silane compound suitable as the component (B) include those expressed by the following formulas, denoting methyl, ethyl, vinyl, phenyl and 1,4-phenylene groups by the symbols of Me, Et, Vi, Ph and $-C_6H_4-$, respectively: $MeSi[NH-C_3H_6-Si(OEt)_3]_3$; $ViSi[NH-C_3H_6-Si(OEt)_3]_3$; $PhSi[NH-C_3H_6-Si(OEt)_3]_3$; $MeSi[NH-C_2H_4NHC_3H_6-Si(OMe)_3]_3$; $ViSi[NH-C_2H_4NHC_3H_6-Si(OMe)_3]_3$; $PhSi[NH-C_2H_4NHC_3H_6-Si(OMe)_3]_3$; $MeSi[NH-C_2H_4NHC_2H_4NHC_3H_6-Si(OMe)_3]_3$; and $MeSi[NH-C_2H_4NHCH_2-C_6H_4-C_2H_4-Si(OMe)_3]_3$.

The amount of the component (B) in the inventive RTV composition should be in the range from 0.1 to 5% by weight or, preferably, from 0.5 to 3% by weight based on the component (A). When the amount thereof is too small, no sufficient improvement can be obtained in the storage stability of the composition and adhesive bonding strength of the cured composition to the substrate surface. When the amount thereof is too large, on the other hand, the cured product of the composition would have an unduly increased hardness in addition to the disadvantage of yellowing.

The component (C), which is an organic tin compound, serves as a catalyst for promoting the dealcoholation condensation reaction between the components (A-1) and (A-3). Various known organic tin compounds used in conventional dealcoholation type RTV compositions can be used without particular limitations including carboxylates of tin, e.g. tin naphthenate, tin caprylate and tin oleate, dibutyl tin diacetate, dibutyl tin dioctoate, dibutyl tin dilaurate, dibutyl tin dioleate, diphenyl tin diacetate, dibutyl tin oxide, dibutyl tin dimethoxide, dibutyl bis(triethoxysiloxy) tin, dibutyl tin dibenzylmaleate and the like.

The amount of the component (C) in the inventive RTV composition should be in the range from 0.01 to 10% by weight or, preferably, in the range from 0.1 to 2% by weight based on the component (A). When the amount thereof is too small, the curing velocity of the composition would be low so that an unduly long time is taken to fully cure the composition and, in particular, complete curing can hardly be obtained in the core portion of a thick body. When the amount of the component (C) is too large, on the other hand, the storage stability of the RTV composition may be decreased.

The components (D) and (E) are each optional in the inventive RTV composition. The component (D) is an alcohol compound which serves to convert any residual content of the silicon-bonded X groups in the component (A-3) into an alkoxy group after the silylation reaction of the silanolic hydroxy groups and water in the components (A-1) and (A-2). The alcohol compound, represented by the general formula (V), in which $R^6$ is a monovalent hydrocarbon group, is exemplified by methyl alcohol, ethyl alcohol, propyl alcohol, butyl alcohol, 2-ethylhexyl alcohol, n-octyl alcohol and the like, of which methyl and ethyl alcohols are particularly preferred. The amount of the component (D), when added, should be at least equimolar to or, preferably, in the range from 1.0 to 1.5 times by moles of the groups denoted by X in the component (A-3). At any rate, the amount thereof should not exceed 10% by weight or usually in the range from 0.1 to 10% by weight based on the component (A). When the amount thereof is too large, the storage stability of the composition would be somewhat decreased.

The component (E) is an alkoxy silane represented by the general formula (VI) or a partial hydrolyzate thereof which also serves to further improve the storage stability of the inventive RTV composition. In the general formula (VI), $R^7$ is a substituted or unsubstituted monovalent hydrocarbon group which is preferably methyl, ethyl, propyl, vinyl, phenyl or 3,3,3-trifluoropropyl group. The symbol $R^8$ denotes an alkyl group, e.g. methyl, ethyl, propyl and butyl groups, or an alkoxy-substituted alkyl group, e.g. 2-methoxyethyl and 2-ethoxyethyl groups, and the subscript m is zero or 1. Particular examples of the alkoxy silane compound suitable as the component (E) include methyl trimethoxy silane, vinyl trimethoxy silane, tetraethoxy silane, methyl triethoxy silane, ethyl trimethoxy silane, methyl triisopropoxy silane, phenyl trimethoxy silane, phenyl tri(2-methoxyethoxy) silane, vinyl tri(2-methoxyethoxy) silane, tetra(2-ethoxyethoxy) silane, 3,3,3-trifluoropropyl trimethoxy silane and the like, of which methyl trimethoxy silane, vinyl trimethoxy silane, phenyl trimethoxy silane, methyl tri(2-methoxyethoxy) silane, vinyl tri(2-methoxyethoxy) silane are particularly preferred.

The amount of the component (E) in the inventive RTV composition, when added, should not exceed 50% by weight based on the component (A). When the amount thereof is too large, the composition may be somewhat poor in the rubbery elasticity after curing.

The inventive RTV composition can be prepared by merely uniformly blending the above described components (A-1) to (A-4), (B) and (C), optionally, with further admixture of the components (D) and (E). A preferable way for the preparation, however, is as follows. Namely, the components (A-1) and (A-2), i.e. the diorganopolysiloxane and the filler, are first blended together to form a uniform compound, of which the content of the silanolic hydroxy groups and water is determined by analysis. Thereafter, the component (A-3) in an amount at least equimolar to the thus determined content of the hydroxy groups and water and the component (A-4) are added and blended into a uniform compound to which the components (B) and (C) as well as the optional components (D) and (E) are added and blended together under reduced pressure.

It is of course optional that the inventive RTV composition is further admixed with various kinds of known additives used in conventional RTV compositions, according to need, including thixotropy modifiers, e.g. polyethylene glycol and derivatives thereof, coloring agents, e.g. dyes and pigments, aging retarders, antioxidants, antistatic agents, flame retardant agents, e.g. antimony oxide and chlorinated paraffins, and thermal conductivity improvers, e.g. boron nitride and aluminum oxide, as well as adhesion improvers, carbon-functional organosilane compounds having amino, epoxy, mercapto and other functional groups, metal carboxylates, metal alcoholates and so on. If desired for the working efficiency in the application, the inventive RTV composition may be diluted with an organic solvent such as hydrocarbon solvents, e.g. toluene and petroleum ether, ketones, esters and the like.

The inventive RTV composition can be rapidly cured into a rubbery elastomer when it is exposed to a moisture-containing atmosphere while it is very stable in storage under a condition with exclusion of moisture over a period of, for example, 6 months or longer with the curability little affected thereby. No toxic or corrosive condensation by-product is formed by the curing reaction and the cured composition exhibits high adhesive bonding strength to the surface of a substrate of, in particular, metals on which it has been cured so that the inventive RTV composition is very useful as an adhesive in electric and electronic parts as well as sealing agent, caulking agent, coating agent and water-repellent agent on various kinds of substrate materials and fabric-finishing agent.

In the following, the RTV composition of the invention is described in more detail by way of examples, in which the term "parts" always refers to "parts by weight" and the values of viscosity are all those obtained by the measurement at 25° C.

EXAMPLE 1

A base compound was prepared by uniformly blending 88 parts of a dimethylpolysiloxane having a viscosity of 20,000 centistokes and terminated at each molecular chain end with a silanolic hydroxy group, 9 parts of a first fumed silica filler having surface blocked with trimethylsilyl groups and 3 parts of a second fumed silica filler surface-treated with an oligomeric cyclic dimethylpolysiloxane. The base compound contained silanolic hydroxy groups and water in an overall amount of 0.0102 mole/100 g.

Thereafter, 100 parts of the base compound were admixed, under exclusion of the atmospheric moisture, with 2.5 parts of vinyl tri(isopropenyloxy) silane and 0.5 part of 3-(1,1,3,3-tetramethylguanidino)propyl trimethoxy silane and then, under reduced pressure, with 0.8 part of methyl alcohol, 5 parts of methyl trimethoxy silane, 0.2 part of dibutyltin dimethoxide, and 1.5 parts of an amino-containing organosilane compound expressed by the formula $MeSi[NH—C_3H_6—Si(OMe)_3]_3$ to give a curable composition. The amount of the vinyl tri(isopropenyloxy) silane corresponded to a molar ratio of 1.09 to the overall amount of the silanolic hydroxy groups and water in the base compound.

The thus prepared RTV composition was shaped by extrusion into a form of sheet having a thickness of 2 mm which was exposed to a moisture-containing atmosphere of 55% relative humidity at 23° C. The surface of the sheet was tack-free within 5 minutes and the sheet was cured by standing in the same atmosphere for 7 days into a rubber sheet of which mechanical properties were measured according to the procedure specified in JIS K 6301 to give the results shown in Table 1. Further, two more cured rubber sheets were prepared in the same manner as above except that the RTV composition had been stored in a hermetically sealed container for 7 days at 70° C. and for 6 months at 23° C. before shaping and curing into the sheets. The surface dryability of the composition to give a tack-free surface was unaffected by these storage tests. The mechanical properties of these two sheets prepared after the storage tests of the RTV composition are shown in Table 1. These results show that the thus prepared RTV composition of the invention has excellent storage stability under exclusion of moisture.

Further, the RTV composition was applied to and spread on test panels of glass, aluminum, fiber-reinforced epoxy resin, polycarbonate resin, acrylic resin, nylon and polybutylene terephthalate resin and exposed to a moisture-containing atmosphere at room temperature to be cured into a layer of a rubbery elastomer. Excellent adhesion of the cured rubber layer was obtained to the surface of each of the above mentioned substrates.

TABLE 1

| RTV composition | Properties of the cured rubber sheet | | |
|---|---|---|---|
| | Hardness, JIS | Ultimate elongation, % | Tensile strength, kg/cm$^2$ |
| As prepared | 24 | 400 | 15 |
| After storage for 7 days at 70° C. | 26 | 410 | 17 |
| After storage for 6 months at 23° C. | 25 | 400 | 16 |

EXAMPLES 2 TO 6 AND COMPARATIVE EXAMPLES 1 TO 3

Eight RTV compositions were prepared each in substantially the same manner as in Example 1 by admixing 100 parts of the base compound prepared in Example 1, according to the formulation shown in Table 2, with: an alkenyloxy silane compound as the component (A-3) which was vinyl tri(isopropenyloxy) silane, methyl tri(isopropenyloxy) silane or phenyl tri(isopropenyloxy) silane, referred to as VPS, MPS and PPS, respectively, in an amount indicated in the table; 3-(1,1,3,3-tetramethylguanidino)propyl trimethoxy silane as the component (A-4) in an amount of 0.5 part excepting Comparative Example 2 in which this silane compound was omitted; an amino-containing organosilane compound as the component (B) which was one of the compounds expressed by the following formulas MeSi[NH—C$_3$H$_6$—Si(OEt)$_3$]$_3$, ViSi[NH—C$_3$H$_6$—Si(OEt)$_3$]$_3$, and PhSi[NH—C$_3$H$_6$—Si(OEt)$_3$]$_3$, referred to as B-I, B-II and B-III, respectively, in an amount indicated in the table with omission in Comparative Examples; dibutyltin dimethoxide as the component (C) in an amount of 0.4 part; methyl alcohol as the optional component (D) in an amount indicated in the table with omission in some formulations; and an alkoxysilane compound as the optional component (E) which was methyl trimethoxy silane or vinyl trimethoxy silane, referred to as MMS and VMS, respectively, in an amount indicated in the table.

The blending work in Comparative Example 3 could not be completed due to the remarkable viscosity increase of the mixture under blending. Each of the other seven compositions prepared in this manner as well as the same compositions after storage in a hermetically sealed condition for 7 days at 70° C. and for 6 months at 23° C. was shaped and cured in the same manner as in Example 1 to give a cured silicone rubber sheet, of which the mechanical properties were measured together with the time taken to give a tack-free condition of the surface. The results are shown in Table 2. The line just below the formulation in Table 2 gives the molar ratio of the alkenyloxy silane compound, i.e. component (A-3), to the overall amount of the silanolic hydroxy groups (Si—OH) and water (H$_2$O) in each of the formulations. The composition of Comparative Example 1 after the storage tests could no longer give a cured rubber sheet having mechanical properties suitable for measurement.

Further, the same adhesion tests of the RTV compositions obtained in Examples 2 to 6 to various test panels were undertaken in the same manner as in Example 1 to find that the adhesive bonding strength of the cured rubber layer was very firm irrespective of the material of the substrates.

TABLE 2

| | | Example | | | | | Comparative Example | | |
|---|---|---|---|---|---|---|---|---|---|
| | | 2 | 3 | 4 | 5 | 6 | 1 | 2 | 3 |
| Formulation | Component (A-3), parts | VPS 3.0 | MPS 2.5 | PPS 3.0 | VPS 2.5 | MPS 3.0 | — | VPS 2.5 | VPS 1.5 |
| | Component (B), parts | B-I 1.0 | B-I 2.0 | B-II 1.5 | B-III 1.5 | B-I 1.5 | — | — | — |
| | Component (D), parts | 1.0 | 0.8 | 1.0 | — | 1.0 | — | — | — |
| | Component (E), parts | MMA 5.0 | MMS 5.0 | MMS 5.0 | MMS 5.0 | VMS 5.0 | VMS 7.0 | VMS 5.0 | MMS 5.0 |
| Component (A-3): (SiOH + H$_2$O), by moles | | 1.30 | 1.15 | 1.07 | 1.09 | 1.38 | 0 | 1.09 | 0.65 |
| As prepared | Tack-free time, minutes | 6 | 7 | 9 | 6 | 6 | 10 | 10 | — |
| | Hardness, JIS | 24 | 24 | 25 | 26 | 25 | 19 | 20 | — |
| | Ultimate elongation, % | 400 | 390 | 420 | 390 | 400 | 280 | 300 | — |
| | Tensile strength, kg/cm$^2$ | 15 | 14 | 13 | 16 | 15 | 10 | 11 | — |
| After storage for 7 days at 70° C. | Tack-free time, minutes | 5 | 7 | 8 | 5 | 6 | — | 60 | — |
| | Hardness, JIS | 26 | 25 | 26 | 28 | 26 | — | 10 | — |
| | Ultimate elongation, % | 410 | 400 | 430 | 400 | 400 | — | 150 | — |
| | Tensile strength, kg/cm$^2$ | 17 | 15 | 15 | 18 | 15 | — | 7 | — |
| After storage for 6 | Tack-free time, minutes | 6 | 7 | 9 | 6 | 6 | — | 60 | — |
| | Hardness, JIS | 25 | 25 | 25 | 27 | 25 | — | 10 | — |

TABLE 2-continued

|  |  | Example | | | | | Comparative Example | | |
|---|---|---|---|---|---|---|---|---|---|
|  |  | 2 | 3 | 4 | 5 | 6 | 1 | 2 | 3 |
| months at 23° C. | Ultimate elongation, % | 400 | 400 | 415 | 400 | 410 | — | 160 | — |
|  | Tensile strength, kg/cm$^2$ | 16 | 15 | 14 | 16 | 16 | — | 8 | — |

EXAMPLES 7 TO 9 AND COMPARATIVE EXAMPLES 4 AND 5

A base compound was prepared by uniformly blending 88 parts of a dimethylpolysiloxane having a viscosity of 20,000 centistokes and terminated at each molecular chain end with a methyl dimethoxy silyl group and the same amounts of the same two kinds of the silica fillers as used in the base compound in Example 1. The base compound prepared here contained 0.0068 mole/100 g of water.

Five RTV compositions were prepared each by uniformly blending 100 parts of the base compound, according to the formulation shown in Table 3, with: vinyl tri(isopropenyloxy) silane as the component (A-3) in an amount indicated in the table; 3-(1,1,3,3-tetramethylguanidino)propyl trimethoxy silane as the component (A-4) in an amount of 0.5 part; an amino-containing organosilane compound as the component (B) which was one of the compounds expressed by the following formulas ViSi[NH—C$_2$H$_4$NHC$_3$H$_6$—Si(OMe)$_3$]$_3$, MeSi[NH—C$_2$H$_4$NHC$_3$H$_6$—Si(OMe)$_3$]$_3$, and MeSi[NH—C$_2$H$_4$NHCH$_2$—C$_6$H$_4$—C$_2$H$_4$—Si(OMe)$_3$]$_3$, referred to as B-IV, B-V and B-VI, respectively, in an amount indicated in the table with omission in Comparative Examples: dibutyltin dimethoxide as the component (C) in an amount of 0.4 part; methyl alcohol as the optional component (D) in an amount indicated in the table; and methyl trimethoxy silane as the optional component (E) in an amount indicated in the table.

The blending work in Comparative Example 4 could not be completed due to the remarkable viscosity increase of the mixture under blending. Each of the other four compositions prepared in this manner as well as the same compositions after storage in a hermetically sealed condition for 7 days at 70° C. and for 6 months at 23° C. was shaped and cured in the same manner as in Example 1 to give a cured silicone rubber sheet, of which the mechanical properties were measured together with the time taken to give the tack-free condition of the surface. The results are shown in Table 3.

Further, the same adhesion tests of the RTV compositions obtained in Examples 7 to 9 to various test panels were undertaken in the same manner as in Example 1 to find that the adhesive bonding strength of the cured rubber layer was very firm irrespective of the material of the substrates.

TABLE 3

|  |  | Example | | | Comparative Example | |
|---|---|---|---|---|---|---|
|  |  | 7 | 8 | 9 | 4 | 5 |
| Formulation | Component (A-3), parts | 1.8 | 2.5 | 1.8 | 1.0 | — |
|  | Component (B), parts | B-IV 1.0 | B-V 1.5 | B-VI 2.0 | — | — |
|  | Component (D), parts | 0.8 | 1.5 | — | 0.3 | — |
|  | Component (E), parts | 5.0 | 5.0 | 5.0 | 5.0 | 7.0 |
| As prepared | Tack-free time, minutes | 5 | 6 | 5 | — | 15 |
|  | Hardness, JIS | 25 | 26 | 25 | — | 22 |
|  | Ultimate elongation, % | 410 | 400 | 410 | — | 430 |
|  | Tensile strength kg/cm$^2$ | 16 | 15 | 16 | — | 16 |
| After storage for 7 days at 70° C. | Tack-free time, minutes | 5 | 6 | 6 | — | 120 |
|  | Hardness, JIS | 26 | 26 | 26 | — | 11 |
|  | Ultimate elongation, % | 420 | 410 | 420 | — | 180 |
|  | Tensile strength, kg/cm$^2$ | 17 | 16 | 16 | — | 8 |
| After storage for 6 months at 23° C. | Tack-free time, minutes | 5 | 6 | 6 | — | 90 |
|  | Hardness, JIS | 25 | 26 | 26 | — | 13 |
|  | Ultimate elongation, % | 410 | 410 | 420 | — | 220 |
|  | Tensile strength, kg/cm$^2$ | 17 | 17 | 16 | — | 10 |

EXAMPLE 10

A base compound was prepared by uniformly blending 30 parts of a dimethylpolysiloxane having a viscosity of 50,000 centistokes and terminated at each molecular chain end with a silanolic hydroxy group, 20 parts of a dimethylpolysiloxane having a viscosity of 100 centistokes and terminated at each molecular chain end with a trimethyl silyl group and 50 parts of a calcium carbonate filler surface-treated with resin acid. The base compound contained silanoic hydroxy groups and water in an overall amount of 0.0129 mole/100 g.

Thereafter, 100 parts of the base compound were admixed, under exclusion of the atmospheric moisture, with 3.5 parts of vinyl tri(isopropenyloxy) silane and 0.5 part of 3-(1,1,3,3-tetramethylguanidino)propyl trimethoxy silane and then, under reduced pressure, with 1 part of methyl alcohol, 5 parts of methyl trimethoxy silane, 0.2 part of dibutyltin dimethoxide and 1.5 parts of an amino-containing organosilane compound expressed by the formula MeSi[NH—C$_3$H$_6$—Si(OEt)$_3$]$_3$ to give a curable composition. The amount of the vinyl tri(isopropenyloxy) silane corresponded to a molar ratio of 1.09 to the overall amount of the silanolic hydroxy groups and water in the base compound.

The thus prepared RTV composition was shaped by extrusion into a form of sheet having a thickness of 2 mm which was exposed to a moisture-containing atmosphere of 55% relative humidity at 23° C. The surface of the sheet was tack-free within 5 minutes and the sheet was cured by standing in the same atmosphere for 7 days into a rubber sheet of which mechanical properties were measured according to the procedure specified in JIS K 6301 to give the results shown in Table 4. Further, two more cured rubber sheets were prepared in the same manner as above except that the RTV composition had been stored in a hermetically sealed container for 7 days at 70° C. and for 6 months at 23° C. before shaping and curing into the sheets. The surface dryability of the composition to give a tack-free surface within 5 minutes was unaffected by these storage tests. The mechanical properties of these two sheets prepared after the storage tests of the RTV composition are shown in Table 4, from which it is clear that this RTV composition also has excellent storage stability.

The adhesion tests of the RTV composition to various test panels were undertaken in the same manner as in Example 1 to find that the adhesive bonding strength of the cured rubber layer was very firm irrespective of the material of the substrates.

TABLE 4

| RTV composition | Properties of the cured rubber sheet | | |
|---|---|---|---|
| | Hardness, JIS | Ultimate elongation, % | Tensile strength, kg/cm² |
| As prepared | 25 | 560 | 22 |
| After storage for 7 days at 70° C. | 25 | 550 | 21 |
| After storage for 6 months at 23° C. | 25 | 550 | 20 |

What is claimed is:
1. A room temperature-curable organopolysiloxane composition which comprises: (A) a combination composed of
 (A-1) 100 parts by weight of a diorganopolysiloxane having a substantially linear molecular structure, of which each of the silicon atoms at the molecular chain ends has a hydroxy group or two alkoxy groups directly bonded thereto,
 (A-2) from 1 to 400 parts by weight of a filler,
 (A-3) from 0.1 to 5 parts by weight of an alkenyloxy silane compound represented by the general formula

$R^1_n SiX_{4-n}$, in which $R^1$ is a substituted or unsubstituted monovalent hydrocarbon group selected from the class consisting of methyl, ethyl, propyl, vinyl, phenyl and 3,3,3-trifluoropropyl groups, X is an alkenyloxy group represented by the general formula

—O—C(CH₂R³)=CHR², $R^2$ and $R^3$ each being a hydrogen atom or an alkyl group selected from the class consisting of methyl, ethyl and propyl groups, and n is zero or 1, or a partial hydrolyzate thereof, and
 (A-4) from 0.01 to 10 parts by weight of an organosilane or organopolysiloxane compound having, in a molecule, at least one substituted or unsubstituted guanidino group represented by the general formula

—N=C(NR⁴₂)₂, in which $R^4$ is a hydrogen atom or a monovalent hydrocarbon group;
(B) an amino-containing organosilane compound represented by the general formula $R^1Si[NR^2\mathrm{-\!\!(\!C_2H_4\!-\!NH\!)\!_x\!R^5}\!-\!Si(OR^4)_3]_3,$ in which $R^1$, $R^2$ and $R^4$ each have the same meaning as defined above, $R^5$ is a divalent hydrocarbon group having 1 to 9 carbon atoms and x is zero, 1 or 2, in an amount in the range from 0.1 to 5.0% by weight based on the component (A); and
 (C) an organic tin compound in an amount in the range from 0.01 to 10% by weight based on the component (A).
2. The room temperature-curable organopolysiloxane composition as claimed in claim 1 which further comprises:
 (D) an alcoholic compound represented by the general formula

R⁶OH, in which $R^6$ is a monovalent hydrocarbon group, in an amount in the range from 0.1 to 10% by weight based on the component (A).
3. The room temperature-curable organopolysiloxane composition as claimed in claim 1 which further comprises:
 (E) an alkoxy silane compound represented by the general formula $R^7_{m'} Si(OR^8)_{4-m'}$ in which $R^7$ is a monovalent hydrocarbon group, $R^8$ is an alkyl group or an alkoxy-substituted alkyl group and m is zero or 1, or a partial hydrolyzate thereof, in an amount up to 50% by weight based on the component (A).
4. The room temperature-curable organopolysiloxane composition as claimed in claim 1 wherein the diorganopolysiloxane as the component (A-1) is a dimethylpolysiloxane having a viscosity of at least 25 centistokes at 25° C.
5. The room temperature-curable organopolysiloxane composition as claimed in claim 1 wherein the alkoxy group at the molecular chain end of the diorganopolysiloxane is a methoxy group.
6. The room temperature-curable organopolysiloxane composition as claimed in claim 1 wherein the alkenyloxy group in the alkenyloxy silane compound as the component (A-3) is an isopropenyloxy group of the formula —O—CCH₃=CH₂.
7. The room temperature-curable organopolysiloxane composition as claimed in claim 1 wherein the component (A-4) is 3-(1,1,3,3-tetramethylguanidino)propyl trimethoxy silane.
8. The room temperature-curable organopolysiloxane composition as claimed in claim 1 wherein the amino-containing organosilane compound as the component(B) is a compound selected from the class of consisting the compounds expressed by the structural formulas:

MeSi[NH—C₃H₆—Si(OEt)₃]₃;
ViSi[NH—C₃H₆—Si(OEt)₃]₃;

PhSi[NH—C₃H₆—Si(OEt)₃]₃;
MeSi[NH—C₂H₄NHC₃H₆—Si(OMe)₃]₃;
ViSi[NH—C₂H₄NHC₃H₆—Si(OMe)₃]₃;
PhSi[NH—C₂H₄NHC₃H₆—Si(OMe)₃]₃;
MeSi[NH—C₂H₄NHC₂H₄NHC₃H₆—Si(OMe)₃]₃; and
MeSi[NH—C₂H₄NHCH₂—C₆H₄—C₂H₄—Si(OMe)₃]₃;

in which the symbols Me, Et, Vi, Ph and —C₆H₄— denote methyl, ethyl, vinyl, phenyl and 1,4-phenylene groups, respectively.

* * * * *

UNITED STATES PATENT AND TRADEMARK OFFICE
CERTIFICATE OF CORRECTION

PATENT NO. : 4,721,765
DATED : January 26, 1988
INVENTOR(S) : Yoshio Inoue, et al.

It is certified that error appears in the above-identified patent and that said Letters Patent is hereby corrected as shown below:

In claim 3, line 26, in the formula of the alkoxy silane compound, after "$R^7_m$", kindly delete "$_1$".

Signed and Sealed this

Twelfth Day of July, 1988

Attest:

DONALD J. QUIGG

*Attesting Officer*  *Commissioner of Patents and Trademarks*